July 22, 1924.

S. S. KONIECZKI

PROTECTOR FOR PNEUMATIC TIRES

Filed Aug. 5, 1922

1,502,637

Inventor
Steve S. Konieczki
By Lancaster Allwine
Attorney

Patented July 22, 1924.

1,502,637

UNITED STATES PATENT OFFICE.

STEVE S. KONIECZKI, OF STEVENS POINT, WISCONSIN.

PROTECTOR FOR PNEUMATIC TIRES.

Application filed August 5, 1922. Serial No. 579,879.

*To all whom it may concern:*

Be it known that I, STEVE S. KONIECZKI, a citizen of the United States, residing at Stevens Point, in the county of Portage and State of Wisconsin, have invented certain new and useful Improvements in Protectors for Pneumatic Tires, of which the following is a specification.

This invention relates to an improved protector for use in connection with inner tubes and shoes of pneumatic tires to provide a correct relative placing of the same with respect to each other and a tire rim.

The primary object of this invention is the provision of an improved tire protector which is relatively simple in construction, and adapted for quick and convenient attachment to a pneumatic tire construction, so that inner tubes of pneumatic tires may be correctly placed against liability of pinching or other deteriorating influences; the improved protector likewise cooperating with the bead flanges of the tire tube in preserving the same.

A further object of this invention is the provision of a pneumatic tire protector adapted for cooperation with the shoe and inner tube portions of the tire so that the same may be properly mounted upon a wheel rim as to prevent rusting, slipping, pinching, or other deteriorating influences from acting thereon.

Other objects and advantages of this invention will be apparent during the course of the following detailed description.

In the accompanying drawing, forming a part of this specification, and wherein similar reference characters designate corresponding parts throughout the several views.

Figure 1:
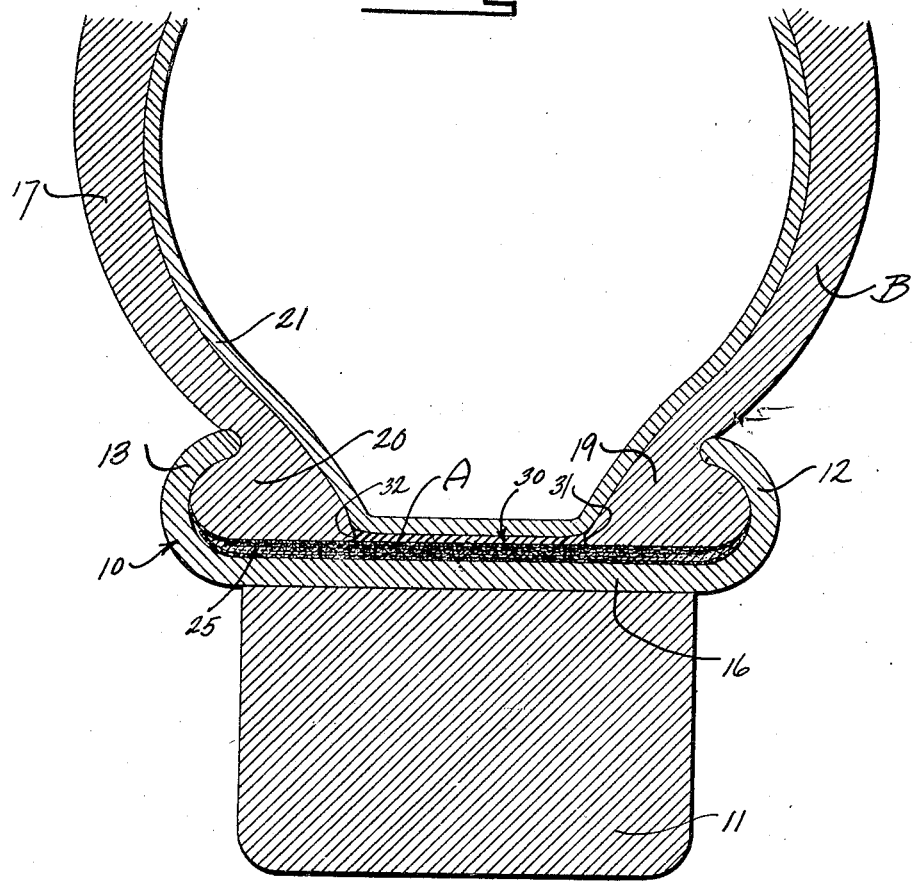
Figure 1 is an enlarged cross sectional view showing the improved protector as utilized in connection with a pneumatic tire assembly.
Figure 2:
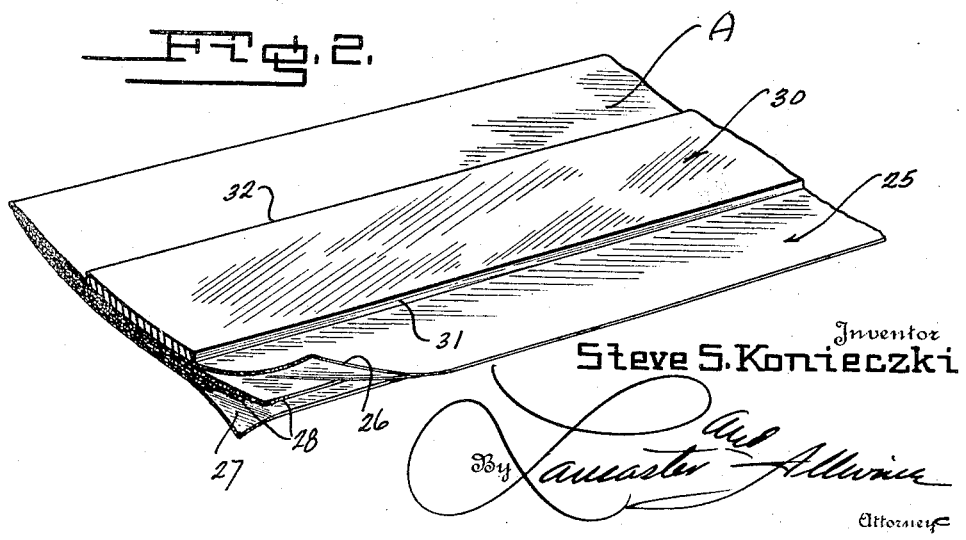
Figure 2 is a fragmentary perspective view of the improved protector, showing cooperating details thereof.

Referring to the drawing, wherein for the purpose of illustration is shown but the preferred embodiment of this invention, the letter A designates the improved protector as utilized in connection with a conventional type of pneumatic tire assembly B.

The tire B is preferably of a conventional type, and may include a clincher type of rim 10, mounted upon a wheel felly 11, and including the channel shaped clincher flanges 12 and 13, and that portion 16 which connects said flanges 12 and 13 and is adapted for circumferential attachment directly upon the felly 11. The assembly B further includes an ordinary shoe 17, which provides the circumferential spaced beads 19 and 20 adapted for cooperation in the channel flanges 12 and 13 of the clincher rim 10 in the well known manner. An inner tube 21 is preferably provided for cooperation within the shoe 17 and may be of the ordinary inflatable type.

With the ordinary types of protectors heretofore utilized in connection with pneumatic tires, it has been found that the same cannot be accurately positioned within the shoe of the tire as to adequately protect the inner tube thereof. During placing of the shoe and pneumatic tire, or during inflating thereof, the ordinary type of protector invariably fits so that the same is either doubled, or the inner tube is pinched intermediate the shoe B and the ordinary protector so that when inflated the inner tube deteriorates, and due to the creases or pinches therein, the same is very apt to blow out. In addition to these disadvantages, the ordinary protector does not protect the shoe B, so that the same becomes rusted, and the rust will cause a deteriorating influence not only on the shoes B, but is transmitted to the inner tube. Rust stripes and spots are of frequent occurrence in the type of pneumatic tire tube with which the ordinary protector is utilized. In fact, the disadvantages associated with the ordinary type of inner tube protector are so numerous and so difficult to overcome even by the most careful mounting of the same, that motorists very often dispense with this ordinary type of protector, and the same is practically in total disuse.

Disadvantages are, of course, encountered in a pneumatic tire in which no protecting arrangement is provided, so that the use of an effective protector is highly desirable. With the use of the improved protector A, disadvantages encountered with the use of the ordinary protector are overcome, and the improved protector A not only preserves and effectively mounts the inner tube 21 within the shoe 17, but likewise preserves the life of the shoe flanges 19 and 20, as will be hereinafter more fully described.

Referring to the improved protector A, the same preferably comprises a base portion 25, which is flexible in character, and preferably formed of a series of layers of water proofing material, such as fabric. This base portion 25 includes a top layer 26 of flexible material, and a lower layer 27 of the same material; a plurality of intermediate layers 28 being provided, which are likewise of the same material. The intermediate layers 28 vary in width and are successively less in width from the top layer 26 toward the bottom layer 27; said layers 28 being uniformally disposed with respect to the longitudinal centers thereof, so that the side portions or lateral edge portions of the base strip 25 gradually diminish in thickness. A strip of resilient material, such as a relatively smooth surfaced good grade of rubber, of uniform thickness, is provided for mounting upon the upper surface of the top layer 26; the same being disposed upon the base portion 25 of the protector A, midway of the lateral edges thereof, as to provide the abrupt marginal edge portions 31 and 32, extending upwardly, substantially at right angles to the plane defined by the upper layer 26, or in fact, the plane defined by the protecting member A.

In the placing of the improved protector A with the tire assembly B, the same is disposed circumferentially within the rim 10, so that the resilient portions 30 thereof is uppermost, and the lateral edge portion of the protector base part 25 are arcuated slightly upwardly within the pockets of the clincher channels 12 and 13, as is clearly illustrated in Figure 1 of the drawing. When mounted in this manner, the rubber portion 30 extends circumferentially about the center of the rim 10. The shoe 17 and inner tube 21 may be conveniently assembled to the rim 10 in the ordinary manner, without liability of displacement of the protector A, since the same can readily be handled in the final placement of the tire shoe 17. As is illustrated in Figure 1 of the drawing, the beads 19 and 20 will engage in the rim flanges 12 and 13 so that the lower surfaces of said beads 19 and 20 rest directly upon the lateral circumferential portions of the base 25, with the inner marginal edges of said beads 19 and 20 in abutting relation with the shoulders 31 and 32 circumferentially provided by the resilient portion 30 of the protector A. The rubber strip or resilient portion 30 of protector A extends inwardly of the pocket defined by the shoe 17, and when the inner tube 21 is in place, the same rests directly upon the proximate surface of the resilient portion 30. Pressure on the shoe 17 and resilient member 30 incident to the inflated inner tube will expand the beads 19 and 20 and the resilient portion 30 so that the marginal shoulders 31 and 32 are in intimate and flush contact with the inner edges of the beads 19 and 20 to provide a smooth jointed connection in which there is no liability of pinching the inner tube.

There is no liability of lateral shifting of the protector A once the same is effectively placed in connection with the assembly B, particularly in view of the fact that the portion 30 extends upwardly within the pocket of the tire tube 17 and engages the beads thereof. It is apparent that the beads 19 and 20 are protected from the deteriorating effect of the rim 10. Due to the smooth surface and cushioning effect of the rubber portion 30, the inner tube 21 may slide relatively thereto, so that there is no liability of overlapping folds of the protector A, and the inner tube A cannot be pinched between the beads 19 and 20.

From the foregoing description of this invention, it can be seen that an effective protector has been provided, which cooperates in a suitable manner with a pneumatic tire assembly as to overcome many disadvantages occurring incident to the use of ordinary protectors.

Various changes in the shape, size and arrangement of parts may be made to the form of the invention herein shown and described, without departing from the spirit of this invention or the scope of the claim.

I claim:

A tire protector comprising a flexible base portion including water proof inner and outer layers of substantially the same width having a series of intermediate layers therebetween successively of less width from the outer layer toward the inner layer, said intermediate layers being uniformally disposed with respect to the longitudinal center of the flexible base portion to gradually reduce said base portion toward the side edges thereof, and a narrow flexible strip mounted on the outer layer of said flexible base portion.

STEVE S. KONIECZKI.